INVENTOR.
LE ROY H. POTTER
BY
O'BRIAN & BLACKHAM
ATTORNEYS

United States Patent Office 3,406,087
Patented Oct. 15, 1968

3,406,087
CROSS-LINKED MOLECULAR ADHESIVE
EXPANSION JOINTS
Le Roy H. Potter, 412 Magnolia,
Glendale, Calif. 91204
Continuation-in-part of application Ser. No. 148,349,
Oct. 30, 1961. This application Mar. 29, 1965, Ser.
No. 445,848
6 Claims. (Cl. 161—184)

This invention pertains to new and improved expansion joints.

This is a continuation-in-part of my application Ser. No. 148,349, filed Oct. 30, 1961, now abandoned.

Expansion joints are commonly used in a wide variety of different types of structures so as to allow for, or permit various parts of such structures to expand and contract. Such expansion and contraction is frequently caused by changes in ambient temperature. It may also, however, be caused by various other factors such as, for example, shrinkage brought upon by weathering of various materials or the like.

A larger number of different types of expansion joints have been developed in the past so as to meet the needs of very specialized fields. Thus, for example in the bridge art it is commonplace to provide expansion joints in roadways which consist of a plurality of interfitting fingers. Joints of this interfitting type are frequently unacceptable for many usages because of the fact that they permit moisture to penetrate between two adjacent members connected by such a joint.

In order to remedy this type of difficulty flexible joints have been developed which utilize various mastic or similar compositions, located between the adjacent surfaces of parts. Various commonplace materials for use in this type of joint such as asphalt are not entirely acceptable for reasons such as the tendency of such materials to deteriorate upon prolonged exposure to ambient conditions and because of the tendency of at least some of such materials to tend to move out of the joint area, particularly at times when such joint material is subjected to elevated temperatures.

Asphalt type mastic compositions and other similar compositions such as those based upon certain types of synthetic rubbers such as polysulfide synthetic rubbers are undesirable for many expansion joints because of the fact that satisfactory bonds are not created between adjacent surfaces separated by such compositions. As a result of this a certain amount of leakage is frequently encountered with prior art expansion joints of the general type indicated in this paragraph.

An object of the present invention is to provide new and improved expansion joints which can be used in providing a waterproof connection between adjacent surfaces or edges of various types of structural members. A further object of the present invention is to provide expansion joints of this type which are substantially immune to the effects of ambient conditions and which may be easily and conveniently created at a comparatively nominal cost.

These and other objects and advantages of this invention will be fully apparent to those skilled in the art to which this invention pertains from a detailed consideration of the remainder of this specification including the appended claims and the accompanying drawings in which:

Figure 1:
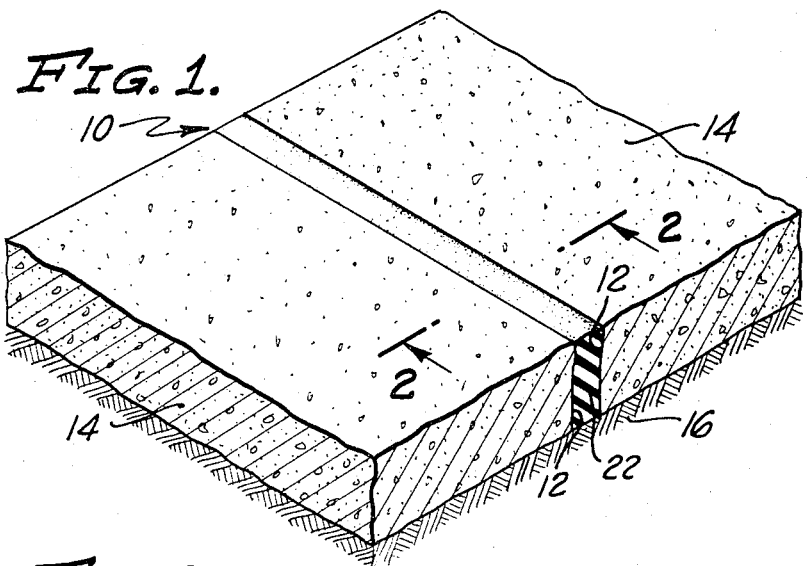
FIG. 1 is a perspective view, partially in section, indicating an expansion joint of this invention used so as to interconnect two adjacent concrete slabs.

It is to be understood that expansion joints falling within the scope of this invention can be used so as to interconnect a wide variety of different types of parts or pieces of material and that such joints may be found in a wide variety of different types of structures such as, for example, buildings, pavements, bridges, pipe sections and the like. Obviously the precise shapes of expansion joints falling within the scope of this disclosure will vary depending upon the nature of the use of such joints. For these reasons this invention is not to be considered as being limited by the accompanying drawing.

As an aid to understanding this invention it can be stated in essentially summary form that it concerns expansion joints, each of which is used so as to interconnect two adjacent, spaced surfaces such as may be found at the edge of structural members. Each of the joints of the present invention includes an elongated strip of incompletely cured curable elastomeric material which is located between such surfaces so as to resiliently bear against them. Such a strip is bonded to these surfaces through the use of an appropriate catalytic setting bonding agent which cures at least the surface of the elastomeric material, as is hereinafter described.

As an aid to further understanding this invention reference is made to the accompanying drawing where there is shown a joint 10 formed so as to interconnect generally parallel surfaces 12 formed at the extremities of a concrete slab 14 such as are commonly used in a conventional roadway pavement. These slabs 14 are located directly upon the surface of the ground 1 in such use. The slabs 14 are, of course, preferably spaced from one another so as to provide adequate room for expansion and contraction such as may be caused by various conditions. In order to prevent damage it is normally desired to interconnect these surfaces 12 so that moisture cannot penetrate between the slabs 14.

Figure 4:
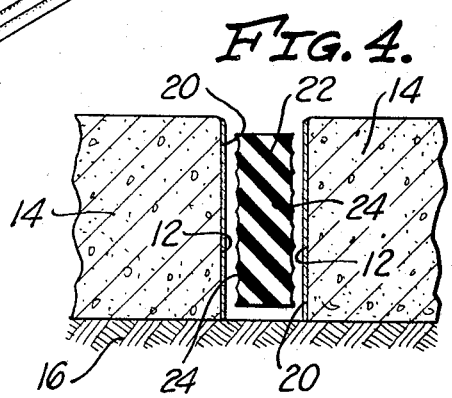
FIG. 4 is a cross-sectional view similar to FIG. 2 illustrating a stage or step in the formation of an expansion joint as herein described.

In accordance with this invention the joint 10 is used so as to accomplish such interconnection. In creating this joint the surfaces 12 are first coated with adhesive layers 20 as shown in FIG. 4 of the drawing. These layers are preferably of a type which will not "set up" or cure for a sufficient period until after subsequent operations as hereafter described are completed. Next, an elongated strip 22 of an elastomeric composition having a thickness in its normal or unstressed state which is greater than the space between the surfaces 12, and which is preferably thicker than it is contemplated that this spacing will ever be, assuming contraction of the slabs 14 as caused by normal ambient conditions, is stretched so that its thickness is less than the width of the space between the surfaces 12. When so stretched the strip 22 is located between these surfaces as indicated in FIG. 4 and the forces holding the strip under tension are then released. This allows the strip 22 to expand outwardly so as to exert pressure against the surfaces 12 so as to be held in a compressed state by contact with these surfaces; and, of course, the adhesive 20 located upon these surfaces. The adhesive 20 is of such a type as to then create a satisfactory bond between the surfaces 12 and the strip 22 of a type which will endure the effects of various ambient conditions.

Figure 2:
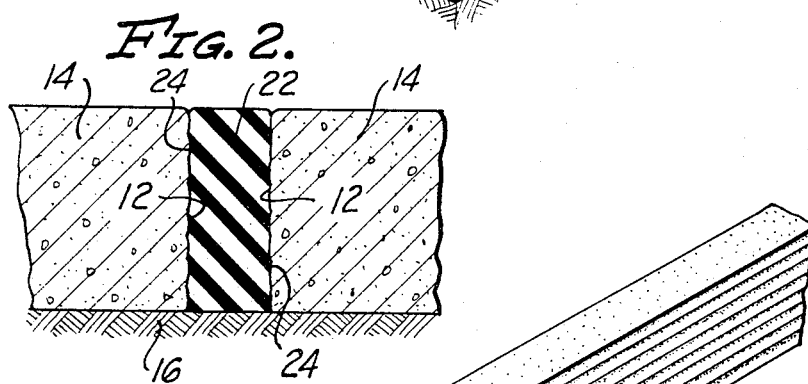
FIG. 2 is a cross-sectional view of this joint taken in the direction of line 2—2 of FIG. 1.
Figure 3:
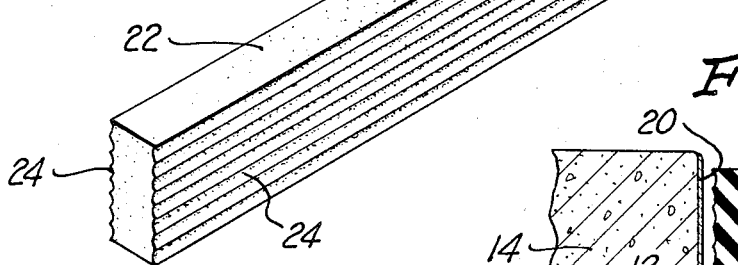
FIG. 3 is a perspective view of a part used in an expansion joint of this invention.

In order to aid in achieving a satisfactory bond preferably the parallel surfaces 24 of the strip 22 which are adapted to fit against the surfaces 12 are provided with a ribbed or similar non-smooth surface configuration as indicated from an examination of FIGS. 2 and 4 of the drawing. It will be seen that this strip 22 is preferably formed so that in both an unstressed and stressed configuration the surfaces 24 correspond approximately to the general shape of the surfaces 12 which are adapted to receive them.

It has been found that the adhesive employed should be of such a type that some satisfactory durable, ambient resistant bond can be achieved between the materials within the strip 22 and the materials composing the surfaces 12 joined through this adhesive 20.

In order to achieve these results it is preferred to utilize with the present invention a strip such as the strip 22 formed out of an elastomeric composition which has not been fully cured or vulcanized. This is considered to leave within the strip 22 various "places" on the molecules within the polymer chains in this strip where a type of cross linkage may be achieved with a particular type of known adhesive employed. Such known adhesive, of course, preferably is the type which during curing tends to promote or enter into a cross-linking type of reaction with the strip 22 to at least some extent. The adhesive chosen must, of course, be of such a type as to satisfactorily bond with the surfaces 12 upon which it is located.

At the present time particularly satisfactory results have been achieved by forming strips such as the strip 22 out of commercial polychloroprene type synthetic rubbers. However, results falling within the scope of this disclosure may be achieved utilizing other types of elastomeric materials such as, for example, natural rubber, butadiene-styrene, synthetic rubbers, nitrile and polyacrylate rubbers, butyl rubbers, synthetic rubbers formed by substituting chlorine and sulfonyl chloride groups into polyethylene, so-called polysulfide rubbers, silicone rubbers and rubbers of a polyurethane type. All of these types of materials are well known at the present time. In this connection reference is made to the text "Introduction to Rubber Technology" by Morton, Reinhold Publishing Corporation, New York, N.Y., 1959 for a more complete disclosure of materials of this type. It will be recognized that many of these materials are aliphatic hydrocarbon polymers.

Despite the wide latitude which is available, as is indicated above, the preferred material, together with the limits of the various ingredients, is indicated below. This preferred material is extruded into the appropriate shape of strip 22 and is incompletely cured.

Isobutylene, isoprene polymer or chloroprene
Clay
Titanium dioxide
Zinc oxide
2,2-methylene bis(4-methyl-6-tert-butyl phenol)
Channel process carbon black
Paraffin
Petrolatum
Sulphur, ground
Tetramethyl thiuram disulfide
2-mercapto benzothiazone
Stearic acid The particular mixture indicated in this table is preferred because of its ability to cure under the ambient conditions present in the joint.

For the purposes of this invention it is desirable to have a rubber premix of such proportions that it is capable of being extruded or otherwise formed to the shape desired and which is capable of holding the shape and giving the nonvulcanized elasticity required in this application. Furthermore the premix must contain the necessary ingredients and amounts of ingredients to permit the mix to vulcanize with time. In this mixture the first item is the rubber-like polymer, and butyl is preferred simply because of its best weatherability. Clay is used as an extender and stiffener, and titanium dioxide is used for color. Zinc oxide is used in the mixture for an extender and for abrasion resistance while the phenol is used as a preventer of light and weather ageing as well as an anti-oxidant. The carbon black is used as an extender in pigment while the paraffin is provided in the mix as a softener and extender. Similarly, petrolatum is used as a softener and extender. Sulphur is used in the mix to provide the sulphur source for sulphur vulcanization. Thiuram and benzothiazone are used in the mix as accelerators, while stearic acid is used as a plasticizer and vulcanization activator. As is well known in rubber technology, the mixture is put together in such a way as to provide the desired properties in the non-vulcanized and vulcanized conditions. In view of the fact that vulcanization is expected to proceed over a relatively long period of time at outdoor ambient temperatures, the mixture is also made in such a way that such can be accomplished. An exemplary butyl molecule, with the center part broken away for convenience in length, because the average molecular weight between the long chain double bonds is about 5000, is shown below. The overall length of the molecule, a portion of which is shown, averages a molecular weight in the order of 300,000.

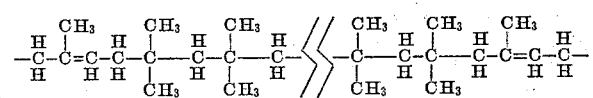

In vulcanization, sulphur attaches to the molecule for cross linking and in the formation of cyclic sulphides. An example of normal sulphur vulcanization is given below, but it is clear that it is merely an example and many other possibilities exist.

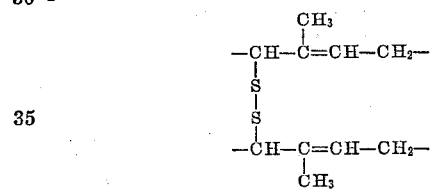

The ambient conditions of the present vulcanization further include the presence of the bonding agent, which bonding agent is discussed in more detail below, which bonding agent causes the beginning of the cure by curing the surfaces of strip 22 in which the bonding agent is in contact. Further cure of the strip 22 appears to be enhanced by this surface cure which is the catalytic beginning of the cure of the entire strip. The cure proceeds by means of air oxidation and continuing oxidation from the oxidizing effect of the curing agents, so that the elastomeric material in the strip 22 completely cures in a reasonable length of time in the normal environment. This cure takes approximately five to six months, which is soon enough to prevent deterioration of the strip. Preferred formulations include highly weatherable elastomers which are even more chemically resistant in the sulphur bearing asmospheres adjacent sewage plants and coal docks.

It is to be importantly noted that the incompletely cured elastomeric material will eventually deteriorate unless there is a cure. The curing of the bonding agent causes curing of the surface of the elastomeric material so that the elastomeric material itself will cure by virtue of air oxidation and apparently by virtue of the catalytic curing at the bonded surface so that in a reasonable period of time, approximately five to six months, the elastomeric material completely cures. In addition to this feature, the compressive pressure caused by the manner in which the elastomeric material is inserted within the joint causes sufficient pressure so as to cause this curing of the bond, and the curing of the bond causes the beginning of the curing of the elastomeric material by providing a cure at the surface. By such curing, the bond between the bonding material and the elastomeric material is greater than the strength of the elastomeric material itself. Furthermore, the catalytic setting of the bonding material to the surfaces 12 is optimum so that the joint opening is completely closed by elastomeric material firmly joined to the bonding material and the bonding material is firmly joined to the surfaces of the adjacent slabs 14.

These materials as used are sufficiently unvulcanized so as to be capable of further vulcanization. In accordance with known procedures, they can easily be formed to a desired strip-like shape by extrusion, pressing or other techniques. When they are in an incompletely cured state preferably they can be stretched as indicated in the preceding but they are not capable of completely returning to their initial configuration upon release of tension. They should, of course, be sufficiently elastic so as to be capable of being stretched and returning to a desired configuration as indicated in the preceding.

The same degree of latitude permitted in use in the manufacture of strips, such as the strip 22, is encountered in the use of adhesives such as the adhesive 20. Virtually any type of known organic or inorganic adhesive can be employed with the broad scope of this invention. However, it is presently preferred to utilize an adhesive of a type which will cure at room temperature containing a catalyst. A large number of different known epoxy type adhesives based on formulations derived by the reaction of epichlorohydrin with bis-phenol are cured using catalysts such as a number of different known organic amines can be employed satisfactorily with this invention with incompletely vulcanized or partially uncured or reacted polymeric materials such as polychloroprene as indicated above.

As is indicated above the preferable bonding material is an epoxy type. Epoxy is generally a condensation product of phenol and actone which is known as Bisphenol A. In the presence of an alkaline catalyst, the Bisphenol A is condensed with the epoxide ring of epichlorohydrin to form chlorohydrin ether. Sodium hydroxide then removes hydrochloric acid from the chlorohydrin to form a new epoxide ring. The reaction continues until one of the reactants is consumed. Most commercial epoxy resins are formulated to contain excess of epichlorohydrin so that the polymers formed will have terminal epoxide groups of the following basic structure.

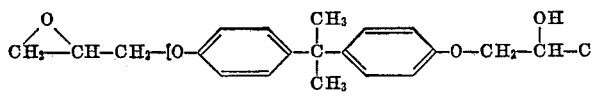

The epoxy resins are cured by many types of materials, including polyamines, polyamides, polysulphides, urea-formaldehyde, phenol formaldehyde, and acids or acid anhydrides. Curing is accomplished through coupling or condensation reactions. The reaction with amines involves opening the epoxide ring to give a beta-hydroxylamino linkage of the type indicated below.

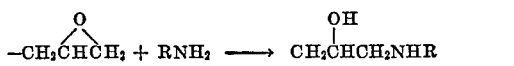

It is clear when considering both the vulcanization of the rubber and the curing of the epoxy, that the available oxygen upon the opening of the epoxide ring joins into the rubber molecule in the place where a sulphur would normally attach for sulphur vulcanization. Thus, a cross linking is obtained between the epoxy molecule and the elastomer molecule. An example of this is shown below.

Actual rubber chemistry, and particularly the reactions during vulcanization are incompletely understood at the present. This is also true to a certain extent of the epoxy reactions. Similarly, the inter-linkage between the elastomer and the epoxy illustrated above is believed to be the reaction that actually takes place. Subjectively it is found that a cured epoxy adhesive joint which is formed upon previously vulcanized rubber is weaker than the rubber itself. However, when the cured epoxy joint occurs on unvulcanized rubber, and the rubber is later vulcanized, it is found that the joint is stronger than the tensile strength of the rubber. Thus, it is clear that chemical inter-linking of the nature illustrated is most likely. To aid in the understanding of this reaction Textbook of Polymer Science, by Billmeyer, 1962, Interscience Publishers division of John Wiley is incorporated herein by this reference.

Because of the nature of this invention it will be realized that expansion joints as hereindescribed may be easily formed which are resistant to sunlight, various types of organic and inorganic chemicals, water, ozone and the like. It will be realized that such joints may be easily and conveniently formed virtually whenever and wherever desired so as to joint sections of sewer pipe, sections of pavement or various types of structural panels to one another. Because of the nature of this invention it is to be considered as being limited solely by the appended claims forming a part of this disclosure.

I claim:
1. An adhesive joint, said adhesive joint comprising:
   a first mass, an elastomeric mass and epoxy adhesive therebetween;
   said epoxy adhesive being a condensation product of Bisphenol-A and epichlorohydrin and being in adhesive engagement with said first mass;
   said elastomeric mass being a body of elastomeric material containing long aliphatic hydrocarbon chains which is capable of being reacted by a vulcanizing type of reaction;
   some of the epoxide groups of said epoxy adhesive be-

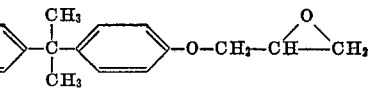

ing cross linked with some of said aliphatic chains so that said elastomeric mass is connected to said epoxy adhesive.

2. An adhesive joint, said adhesive joint comprising:
   a first mass, an elastomeric mass and an epoxy adhesive;
   said epoxy adhesive being a condensation product of Bisphenol-A and epichlorohydrin and initially having epoxide rings which are open and cross linked upon curing, said epoxy adhesive being adhesively adhered to said first mass;
   said elastomeric mass including long chain unsaturated butyl rubber hydrocarbon molecules which are cross linked by vulcanization-like reactions;
   said epoxy adhesive being in surface contact with said elastomeric mass, some of the epoxide rings being opened and cross linked with some of said long chain unsaturated hydrocarbon molecules in said elastom-

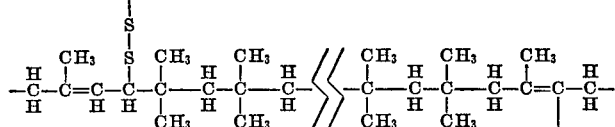

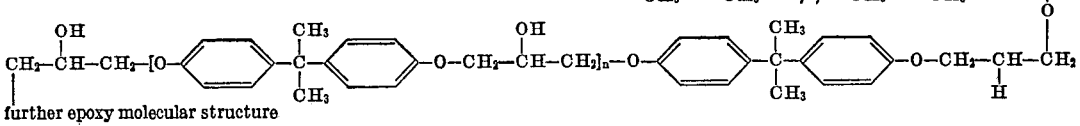

eric mass so that a chemical bond is in effect across said surface contact.

3. A layer of epoxy material formed by the condensation of Bisphenol-A and epichlorohydrin secured to a mass of elastomeric material containing aliphatic hydrocarbon chains, said epoxy material containing bisphenol ether which has its epoxide rings open and cross linked; said elastomeric mass containing long chain unsaturated hydrocarbon aliphatic molecular chains which are cross linked with a vulcanization type of reaction; at least some of said cross linking occurring between said open epoxide rings and said long chain unsaturated aliphatic molecular chains in said elastomeric mass.

4. The structure of claim 3 wherein said long chain unsaturated hydrocarbon molecules in said elastomeric mass are butyl molecules.

5. A cross linked molecular structure wherein a portion of said molecule contains an epoxy adhesive polymer having a condensation product formed by the reaction of Bisphenol-A and epichlorohydrin having opened epoxide rings and another portion of said molecule comprises an unsaturated long chain aliphatic hydrocarbon polymer having elastomeric properties and wherein the open epoxide ring is bonded to one of the carbon atoms in said long chain unsaturated hydrocarbon portion of said molecule.

6. A molecular structure having the general form of

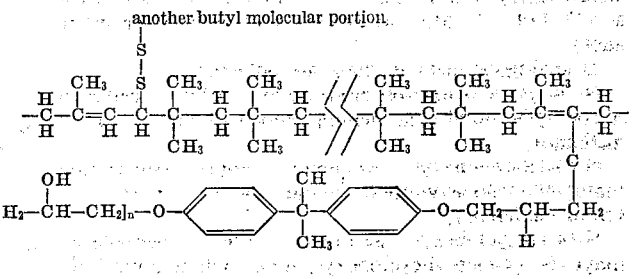

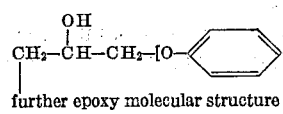

further epoxy molecular structure wherein the molecular weight between the double bonds in said chain hydrocarbon structure is between 1,000 and 10,000.

References Cited

UNITED STATES PATENTS

| | | | |
|---|---|---|---|
| 3,351,517 | 11/1967 | Willis | 161—184 |
| 2,943,953 | 7/1960 | Daniel | 94—22 X |
| 1,885,391 | 11/1932 | Thompson | 94—18.2 |
| 2,221,431 | 11/1940 | Omansky | 94—18.2 |
| 3,172,921 | 3/1965 | Flowers | 260—836 |
| 3,182,105 | 5/1965 | Bonvicini | 260—836 |
| 3,171,821 | 3/1965 | Sherman et al. | 260—3 |
| 3,318,972 | 5/1967 | Mertzweiller et al. | 260—836 |
| 2,830,038 | 4/1958 | Pattison | 260—830 X |
| 3,042,545 | 7/1962 | Kience et al. | 260—830 X |
| 3,148,167 | 9/1964 | Keplinger | 260—830 X |
| 3,158,586 | 11/1964 | Krause | 260—830 X |
| 3,239,580 | 3/1966 | Pendleton et al. | 260—830 |
| 3,238,273 | 3/1966 | Hampson et al. | 260—830 |
| 3,242,108 | 3/1966 | McGary et al. | 260—830 X |
| 2,886,473 | 5/1959 | Schroeder | 117—143 |

HAROLD ANSHER, *Primary Examiner.*

UNITED STATES PATENT OFFICE
CERTIFICATE OF CORRECTION

Patent No. 3,406,087                                October 15, 1968

Le Roy H. Potter

It is certified that error appears in the above identified patent and that said Letters Patent are hereby corrected as shown below:

Columns 7 and 8, the formula of claim 6 should appear as shown below:

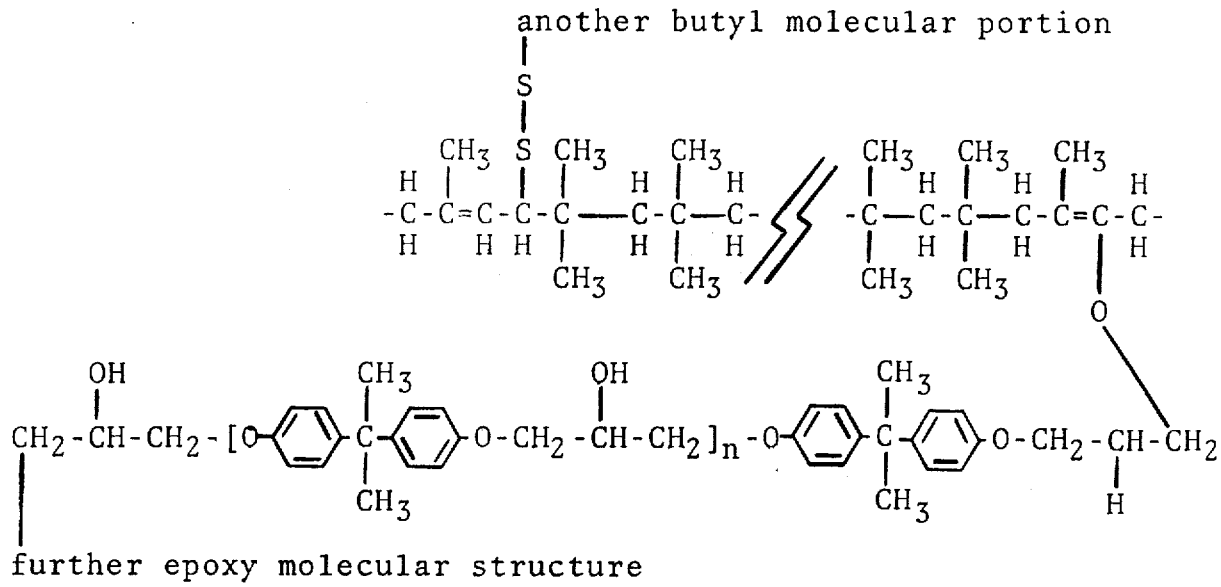

Signed and sealed this 3rd day of March 1970.

(SEAL)
Attest:

EDWARD M. FLETCHER, JR.　　　　　　　　WILLIAM E. SCHUYLER, JR.
Attesting Officer　　　　　　　　　　　　Commissioner of Patents